United States Patent
Krishnamoorthy et al.

(10) Patent No.: US 7,458,391 B2
(45) Date of Patent: Dec. 2, 2008

(54) ASSEMBLING A SIPHONABLE FILLER TUBE WITH A CHECK VALVE ON A FUEL TANK

(75) Inventors: Pk Haridass Krishnamoorthy, Belleville, MI (US); Charles J. Martin, Dexter, MI (US); Maxim V. Zorine, Ann Arbor, MI (US); Steven H. Verzyl, Ypsilanti, MI (US); Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 371 days.

(21) Appl. No.: 10/975,330

(22) Filed: Oct. 28, 2004

(65) Prior Publication Data
US 2005/0139271 A1 Jun. 30, 2005

Related U.S. Application Data

(63) Continuation-in-part of application No. 10/024,252, filed on Dec. 21, 2001, now abandoned.

(51) Int. Cl.
*B60K 15/077* (2006.01)
*B60K 15/04* (2006.01)
*F16K 15/03* (2006.01)

(52) U.S. Cl. ............ 137/527.4; 137/151; 137/592

(58) Field of Classification Search ........ 137/587, 137/588, 592, 593, 527, 527.4, 123, 124, 137/151
See application file for complete search history.

(56) References Cited

U.S. PATENT DOCUMENTS

| | | | | |
|---|---|---|---|---|
| 4,610,284 A | * | 9/1986 | Bartholomew | 137/588 |
| 5,159,953 A | * | 11/1992 | Sato et al. | 137/527.8 |
| 5,327,933 A | | 7/1994 | Ishikawa | |
| 5,887,615 A | * | 3/1999 | Goto et al. | 137/527 |
| 6,056,029 A | * | 5/2000 | Devall et al. | 137/588 |
| 6,234,195 B1 | * | 5/2001 | Kippe et al. | 137/588 |
| 6,237,621 B1 | * | 5/2001 | Chaffee | 137/527 |
| 6,648,016 B2 | * | 11/2003 | Farrenkopf et al. | 137/588 |
| 6,932,100 B2 | * | 8/2005 | Martin et al. | 137/527 |
| 6,959,727 B2 | * | 11/2005 | Krishnamoorthy et al. | 137/588 |
| 2005/0139271 A1 | | 6/2005 | Krishnamoorthy et al. | |

FOREIGN PATENT DOCUMENTS

EP 1 504 944 A1 2/2005
WO WO 03/053732 A2 7/2003

* cited by examiner

*Primary Examiner*—John Rivell
(74) *Attorney, Agent, or Firm*—Anna M. Shih

(57) ABSTRACT

A fuel filler tube assembly including a one-way valve or check valve. The tube assembly is adaptable for pre-assembly on either a metal or plastic fuel tank and employs a common check valve with an adapter tube for plastic tanks. The valve employs a flapper with spaced ribs for deflecting a siphon hose away from the valve seal; and, the ribs are spaced to maintain the flow stream of he fuel during refueling and facilitating opening of the flapper.

17 Claims, 7 Drawing Sheets

ASSEMBLING A SIPHONABLE FILLER TUBE WITH A CHECK VALVE ON A FUEL TANK

CROSS REFERENCE TO RELATED APPLICATION

This application is a continuation-in-part (CIP) of application U.S. Ser. No. 10/024,252, filed Dec. 21, 2001, in the name of P K Haridass Krishnamoorthy, Charles J. Martin, Maxim V. Zorine, Steven A. Verzyl and Robert P. Benjey for "Assembling A Siphonable Filler Tube With A Check Valve On A Fuel Tank".

BACKGROUND OF THE INVENTION

The present invention relates to filling systems for vehicle fuel tanks and particularly tanks of the type which have a remotely accessible filler tube, for example, of the type accessible through a fuel filler door mounted on the side of the vehicle. Fuel tank installations of this sort are commonly employed on passenger cars and light trucks where it is desired to have the fuel tank filler recessed within the vehicle body and covered by a filler door which blends with the side structure of the vehicle for esthetic or styling purposes.

Vehicle fuel tank filler systems require a positive seal of the filler tube or "neck" when the filler nozzle is removed in order to meet mandatory fuel vapor emission requirements; and, thus it has been the practice to provide a one-way valve, typically in the form of a flapper door valve to close the filler tube when fuel is not being introduced to the filler tube during refueling.

It is known to provide a fuel tank filler tube check valve in the filler tube assembly externally of the fuel tank when the filler tube nozzle receiver is attached to the filler tube upon installation of the tank onto the vehicle during manufacturing of the vehicle. However, this arrangement requires the handling of separate filler tube hose connections and the check valve on the vehicle assembly line and thus increases the number of parts or components to be supplied to the assembly line and the complexity of vehicle assembly.

The problem is further complicated by the fact that present vehicle production utilizes both plastic and metal fuel tanks which require two different types of attachment of the filler tube thereto. Thus, it has been desired to provide a way or means of incorporating a single, fuel tank filler tube check valve which may be employed in a pre-assembled package with a fuel tank of either metal or plastic material without the need for having two different check valve arrangements. Furthermore, it has been desired to provide such a fuel tank filler tube check valve arrangement which will readily accept a siphon tube or hose therethrough for removing fuel from the tank in the event that service or replacement of the fuel tank is required.

It has also long been desired to provide a vehicle fuel tank with the filler tube assembly attached thereto and the one-way check valve incorporated therein as a complete tank subassembly ready for installation on the vehicle.

BRIEF SUMMARY OF THE INVENTION

The present invention provides a solution to the above-described problem of designing a fuel filler tube or neck assembly including a one-way check valve which may be pre-assembled to the fuel tank and including a nozzle receiving receptacle on the end of the filler tube. The filler tube assembly of the present invention includes a one-way valve for check valve and may be pre-assembled to either a metal fuel tank or a plastic fuel tank. The filler tube assembly including the one-way check valve of the present invention readily accepts a siphon hose inserted through the filler nozzle receiving receptacle end of the filler tube assembly and permits passage of the siphon hose through the one-way valve into the fuel tank without the risk of the end of the siphon hose being caught or sticking in the one-way valve or damaging the elastomeric seal for the one-way valve.

DETAILED DESCRIPTION OF THE INVENTION

Figure 1:
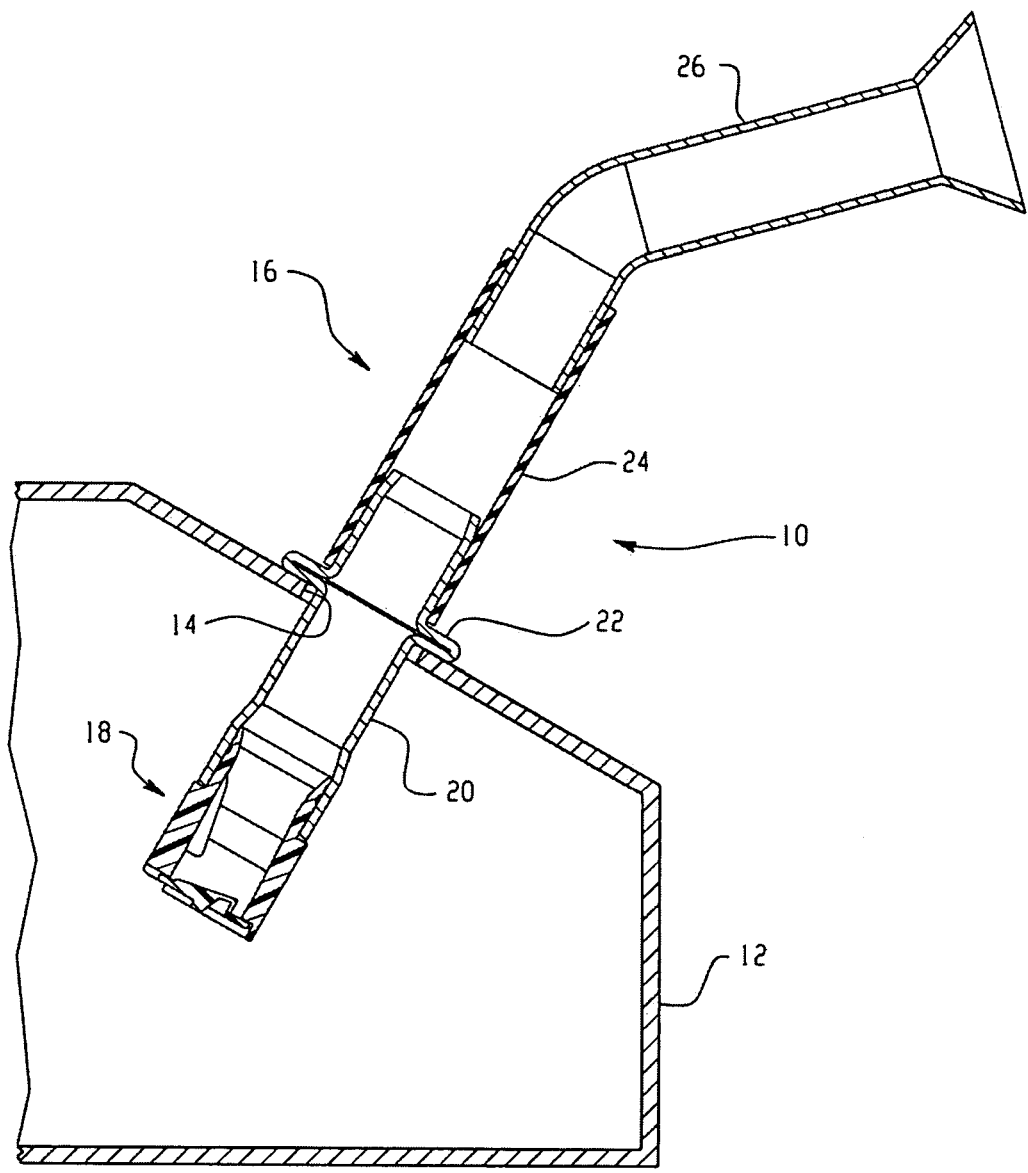
FIG. 1 is a cross-section of a portion of a metal fuel tank having the filler tube and check valve assembly of the present invention attached thereto.

Referring to FIG. 1, a fuel tank and filler tube assembly employing the present invention is indicated generally at 10 and is shown as applied to a metal a fuel tank 12 having an access opening 22 formed in the upper wall thereof with a filler tube assembly including a one-way valve indicated generally at 16 received therethrough and secured thereon. The assembly 16 includes a one-way valve indicated generally at 18 with a metal attachment tube 20 having one end thereof received over the valve 18; and, tube 20 may include an annular convolution 22 formed thereon and may be secured over the opening 22 and sealed thereon by any suitable expedient as, for example, weldment to the tank 12.

The upper end of the tube 20 extends outwardly of the tank and has received thereover a filler hose, preferably of elastomeric material as denoted by reference numeral 24 with the lower end thereof received over the upper end of tube 20. The upper end of the hose 24 may have received therein a nozzle receiving receptacle tube 26 which has the upper end thereof open and adapted for receiving therein a refueling nozzle (not shown).

Figure 3:
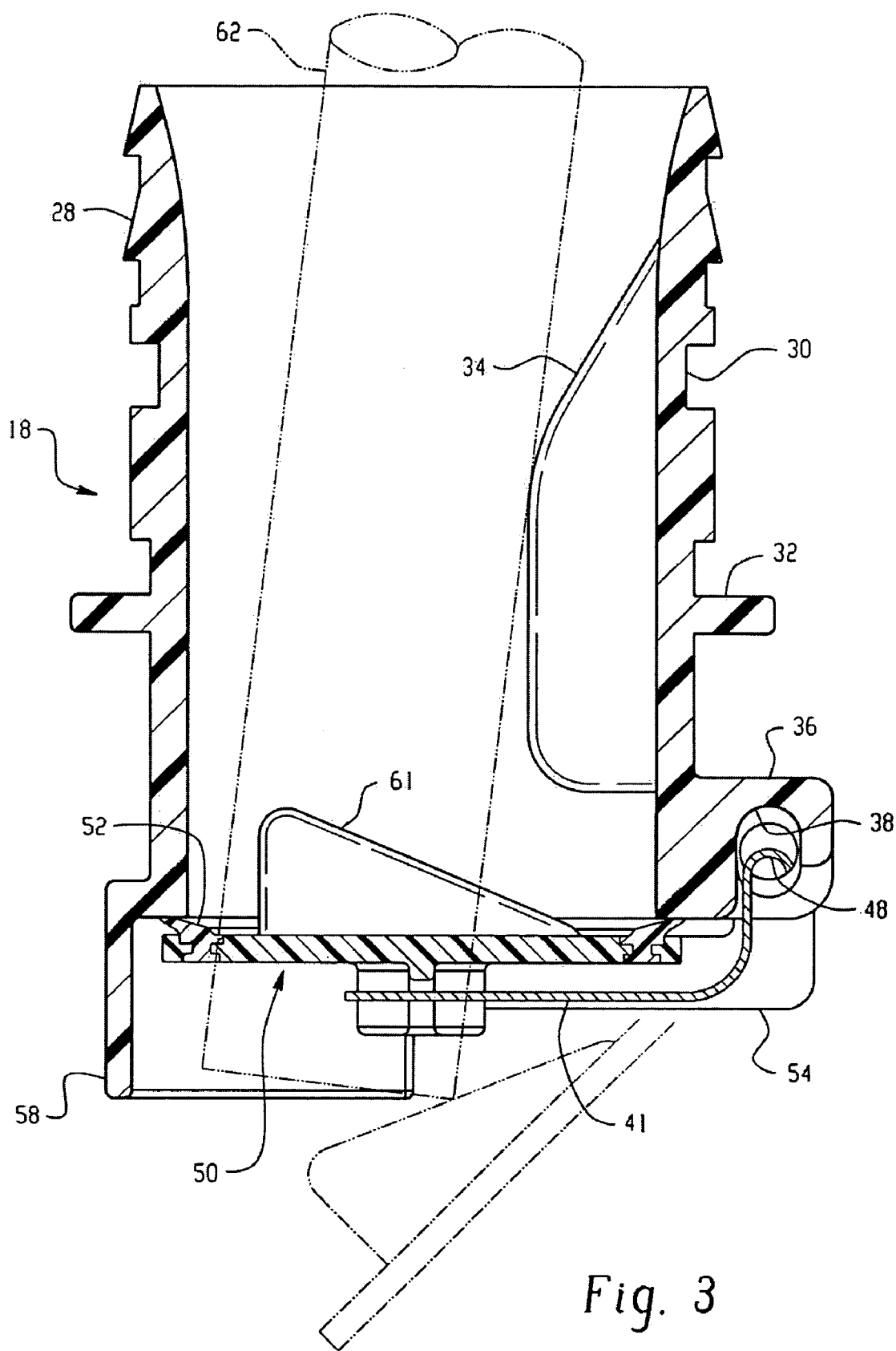
FIG. 3 is a cross-section of an embodiment of the valve employed in the assembly of FIG. 1.

Referring to FIG. 3, the valve 18 is shown in cross-section and enlarged and includes a tubular body 28 having the upper end thereof provided with an annular barb with a seal ring groove 30 formed therein; and, an annular mounting flange 32 may be provided if desired, intermediate the ends of tube 28 and below the seal ring groove 30. The inner periphery of the tube 28 has at least one and preferably a plurality of circumferentially spaced radially inwardly extending ribs 34 formed therein.

The lower end of the tube 28 has a projection 36 extending outwardly therefrom and circumferentially aligned with ribs 34. The projection 36 has formed therein a slot 38 which is elongated in the axial direction of the tube and which has received therein a torsion spring 48 which has one end thereof extending radially inwardly over the end of the tube 28.

The tube 28 is preferably formed of plastic and may have electrically conductive material interspersed therein for facilitating discharge of accumulated static electrical charge.

A moveable valve member which may be configured as a flapper is indicated generally at 50 and is disposed over the end of the tube 28 and has an annular resilient preferably elastomeric seal 52 secured about the periphery thereof for sealing contact with a valve seating surface 33 disposed on the lower end of the tube 28. The valve member 50 has a pair of arms 54 extending outwardly therefrom on opposite sides of the valve member 50 with each of the arms having an inwardly extending trunnion 56 formed thereon. Upon attachment of valve member 50 each of the arms 54 is deflected; and, the trunnions 56 are each respectively engaged in an opposite end of the slot 38 on the projection 36 thereby forming hinges for pivotal movement of the valve member 50 about the end of the tube 28. If desired, a partially circumferentially extending shield or shroud 58 may be formed about the lower end opening of the tube 28 and about the valve member 50.

Figure 6:
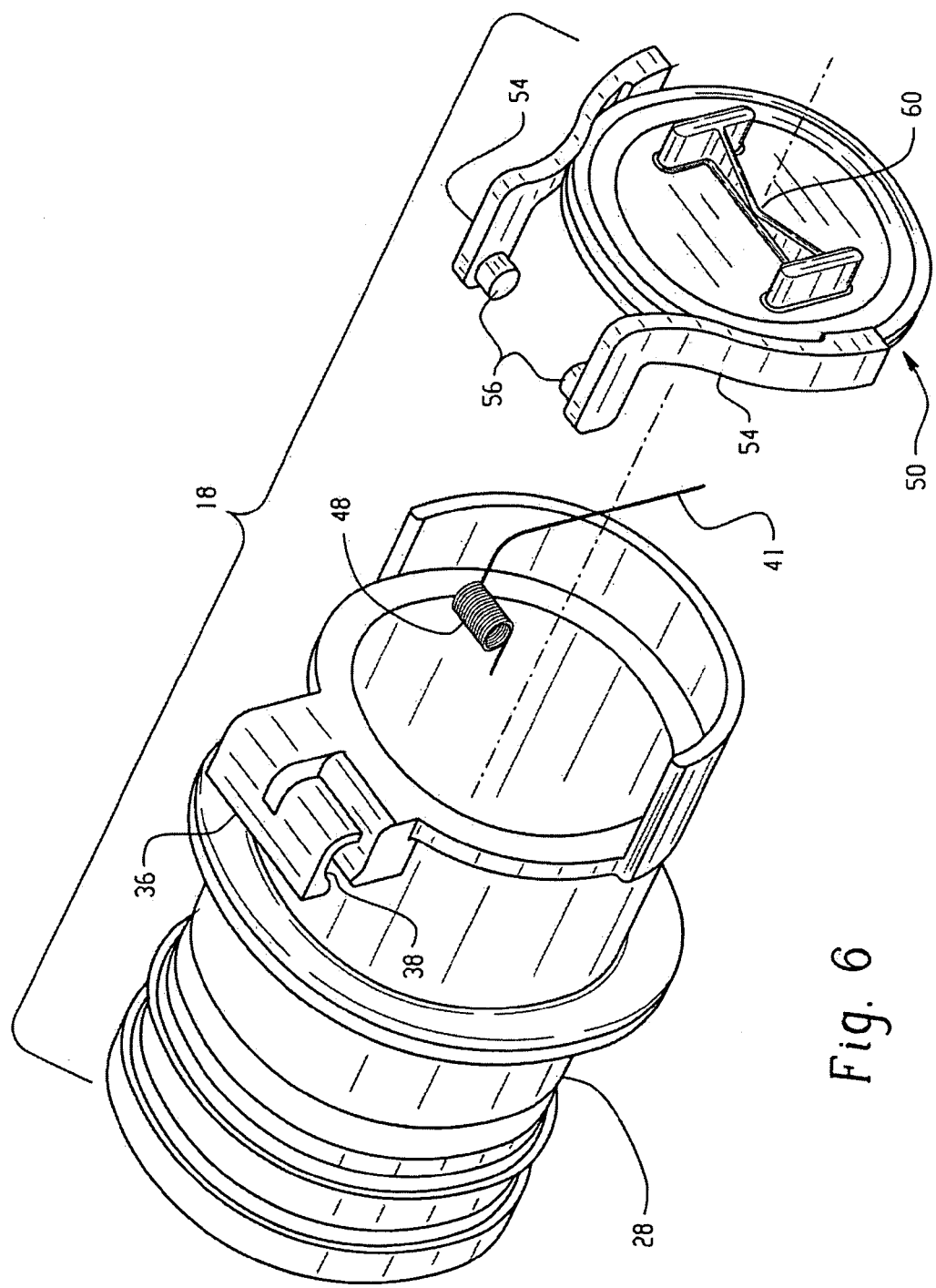
FIG. 6 is an exploded view of the valve of FIG. 3.

The inwardly extending end 41 of the torsion spring slidably engages a raised contact surface 60 (see FIG. 6) provided on the outer face of the valve member 50.

It will be understood that the trunnions 56 are free for limited lost motion movement in an axial direction within the slot 38 thereby permitting the force of the end 41 of the torsion spring to be centrally applied to the valve member 50 at surface 60 and to permit the valve member 50 to self-align for seating on the end of the tube 28. It will be understood that spring 48 is operative to have its end 41 apply sufficient force to seat the seal on valve seating surface 33. However, the spring 48 must be configured such that the bias force applied to valve member 50 by spring end 41 is low enough such that during refueling it permits the force of fuel flowing in the filler tube to overcome the spring bias and move the valve member 50 away from seating surface 33.

Figure 7:
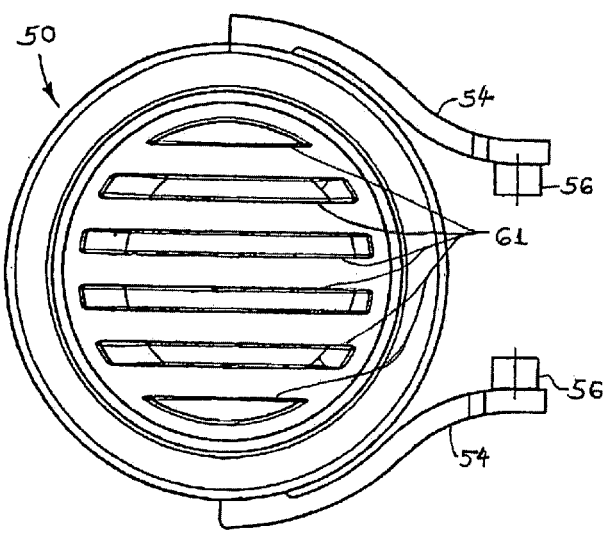
FIG. 7 is a top view of the valve member of FIG. 3.
Figure 8:
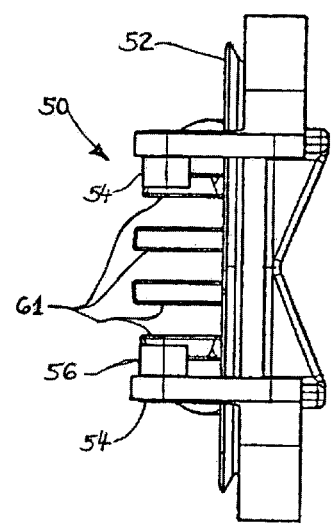
FIG. 8 is a side view of the valve member of FIG. 7.

Referring to FIGS. 7 and 8, the valve 50 includes a plurality of spaced deflector ribs 61 formed on the inside surface thereof and which are configured and serve to provide a camming action to open the valve upon insertion of a siphoning hose, indicated in dashed outline and denoted by reference numeral 62 in FIG. 3. The end of hose 62 slides along the rib 34 and contacts the rib 61 effecting pivoting of the valve 50 about the trunnions 56 in slot 38 to the position shown in dashed outline in FIG. 3. Ribs 34 and 61 serve to direct the siphoning hose away from seal 52 thereby preventing the base from catching on or damaging the hose.

Ribs 61 are spaced a sufficient distance apart such that flow from a refueling nozzle impinging on the upper surface of valve member 50 is prevented from splattering on the surface of member 50 and flows into and through the spaces between the ribs. This action prevents the fuel flow direction from being substantially redirected causing a spray which would generate more fuel vapor and tend to increase the vapor pressure in the tank and thus render refueling difficult. The ribs spacing permits the flow to retain its kinetic energy and thus keeps the valve open and facilitates tank filling. In the present practice of the invention, it has been found advantageous to employ a rib spacing of about five millimeters; however, different spacing may be used if desired.

Figure 2:
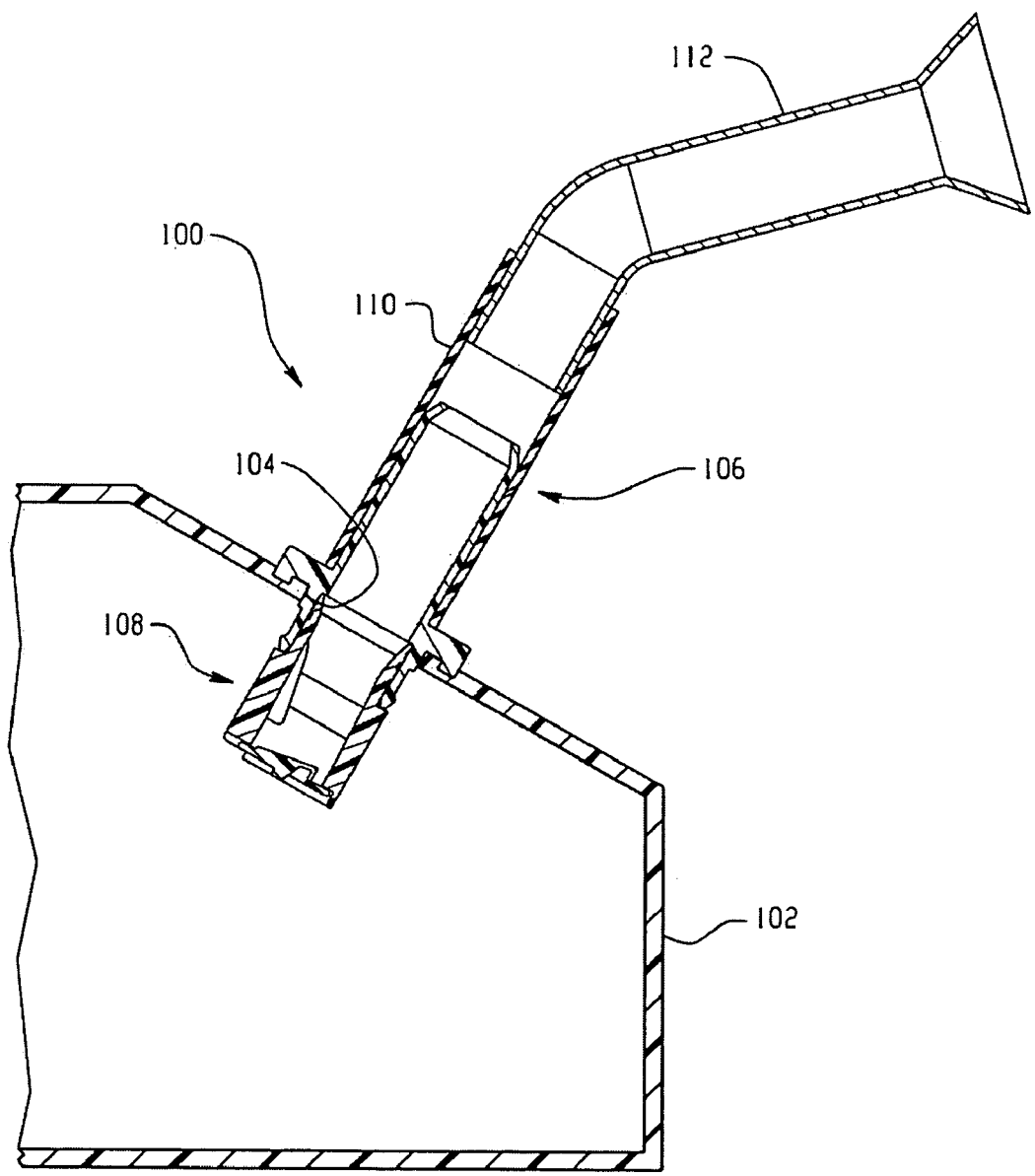
FIG. 2 is a view similar to FIG. 1 of an alternate embodiment of the invention installed on a plastic fuel tank.

Referring to FIG. 2, an alternate system indicated generally at 100 employing the present invention is illustrated as a plastic fuel tank 102 having an access opening 104 formed in a portion of the upper wall thereof through which is inserted a filler tube assembly indicated generally at 106 which includes a one-way or check valve assembly indicated generally at 108 and a hose 110 with the lower end thereof received over a portion of the valve assembly extending externally of the tank; and, a filler nozzle receptacle tube 112 adapted for connection to the vehicle structure is attached to the upper end of hose 110.

Figure 5:
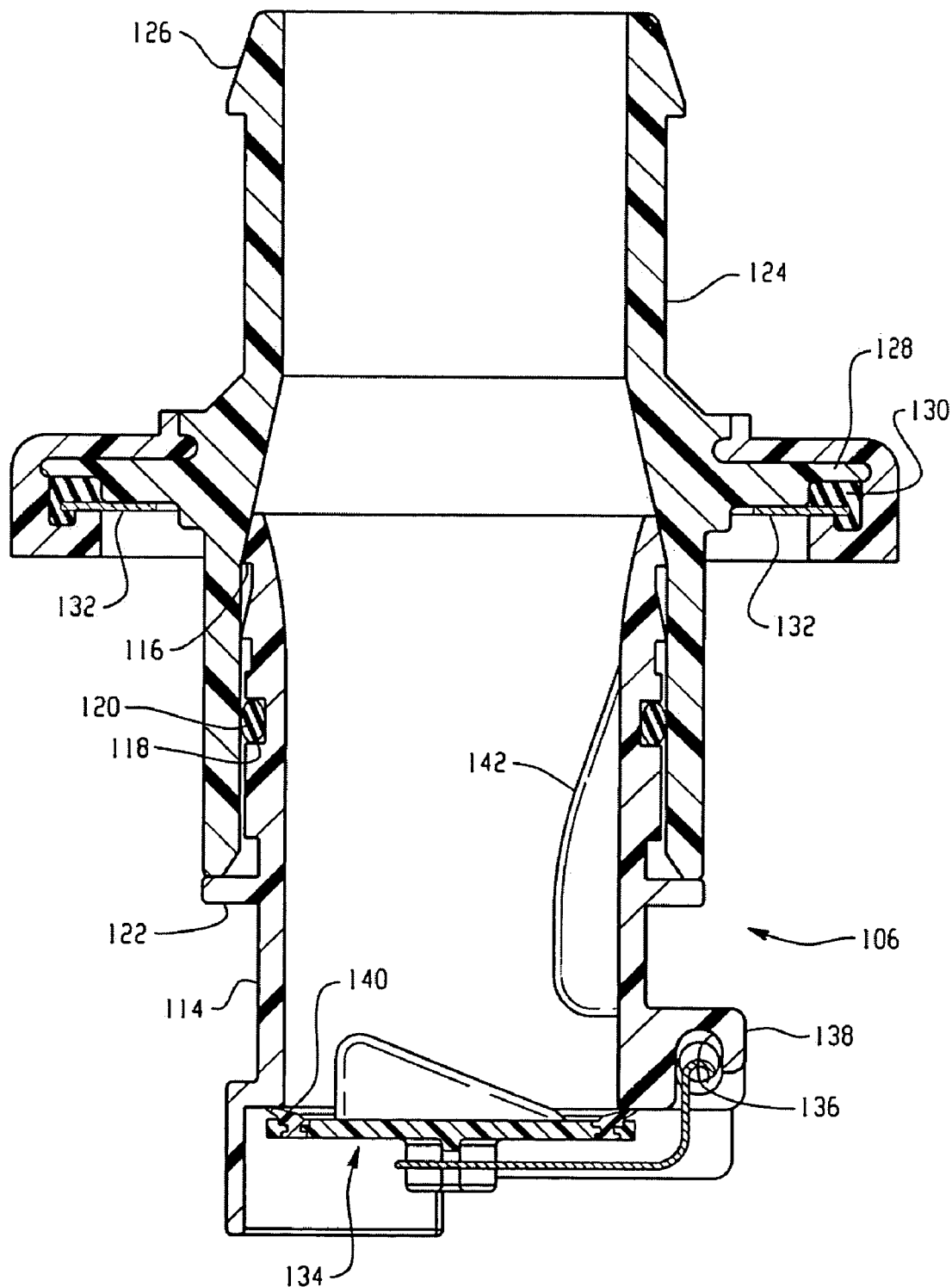
FIG. 5 is an arrangement of the valve of FIG. 3 for use in the system of FIG. 2.

Referring to FIG. 5, the one-way valve assembly 108 is shown in enlarged detail as having a valve body with a generally tubular configuration as denoted by reference numeral 114 with the upper end thereof having an annular barb 116 formed thereon and a seal ring groove 118 formed therein intermediate the ends thereof with a seal ring 120 received therein. An annular flange 122 may be formed about the outer periphery of the tubular member 114 intermediate the seal groove 118 and the lower end of the tube.

A mounting member 124 preferably with an elongated tubular configuration has one end thereof sized and configured to be received over the annular barb 116 of valve tube 114; and, the tubular mounting member 124 has the inner periphery thereof sealing over the ring 120 on the valve tube 114. Preferably the lower end of the tubular member 124 is registered against one axial face of the flange 122. The upper end of the tubular member 124 or end opposite the flange 122, may have an annular barb 126 formed thereon for engaging the end of the hose 110 (FIG. 2) in fluid sealing engagement.

The annular mounting member or tube 124 has a radially outwardly extending flange 128 formed about the outer periphery thereof and located axially intermediate the ends of the member 124. However, it will be understood that the flange 128 may be located at other positions on the tubular member 124 as, for example, at the lower end thereof if desired.

The flange 128 has an annular seal member 130, preferably formed of elastomeric material, disposed about the periphery thereof adjacent the underside of the flange; and, the seal 130 may be retained thereon by a retaining ring 132 having its inner periphery frictionally engaging a shoulder 129 provided on the tubular member 124.

The flange 128 and seal ring 130 are provided with an overlayer or overmold 132 formed of material compatible with the tank 102 such that the overmold 132 may be attached and sealed to the tank by weldment upon insertion of the valve 106 through the access opening 104.

The tubular member 114 has a one-way valve member or flapper indicated generally at 134 which is pivoted about a slot 136 formed in a projection 138 provided on the tubular member 114. The valve member 134 has an annular seal 140 provided about the periphery thereof for sealing against the end of tube 114. Valve member 134 also has spaced ribs 135 on the upper surface thereof which are similarly configured and spaced and performing the same function as ribs 61 on the valve member 50 of the embodiment of FIG. 3. Alternatively seal 140 may be mounted on the lower end of tube 114. It will be understood that the operation and construction of the valve 134 is similar to that of the valve 50 of the FIG. 3 embodiment. The tube 114 similarly has a hose deflecting rib 142 formed therein which is configured similarly to function identically as the rib 34 in the embodiment of FIG. 3. It will be apparent that the valve arrangement 106 of FIG. 5 thus permits the valve structure of the embodiment 18 of FIG. 3 to be mounted in an adapter tube 124 and secured to a plastic fuel tank.

Figure 4:
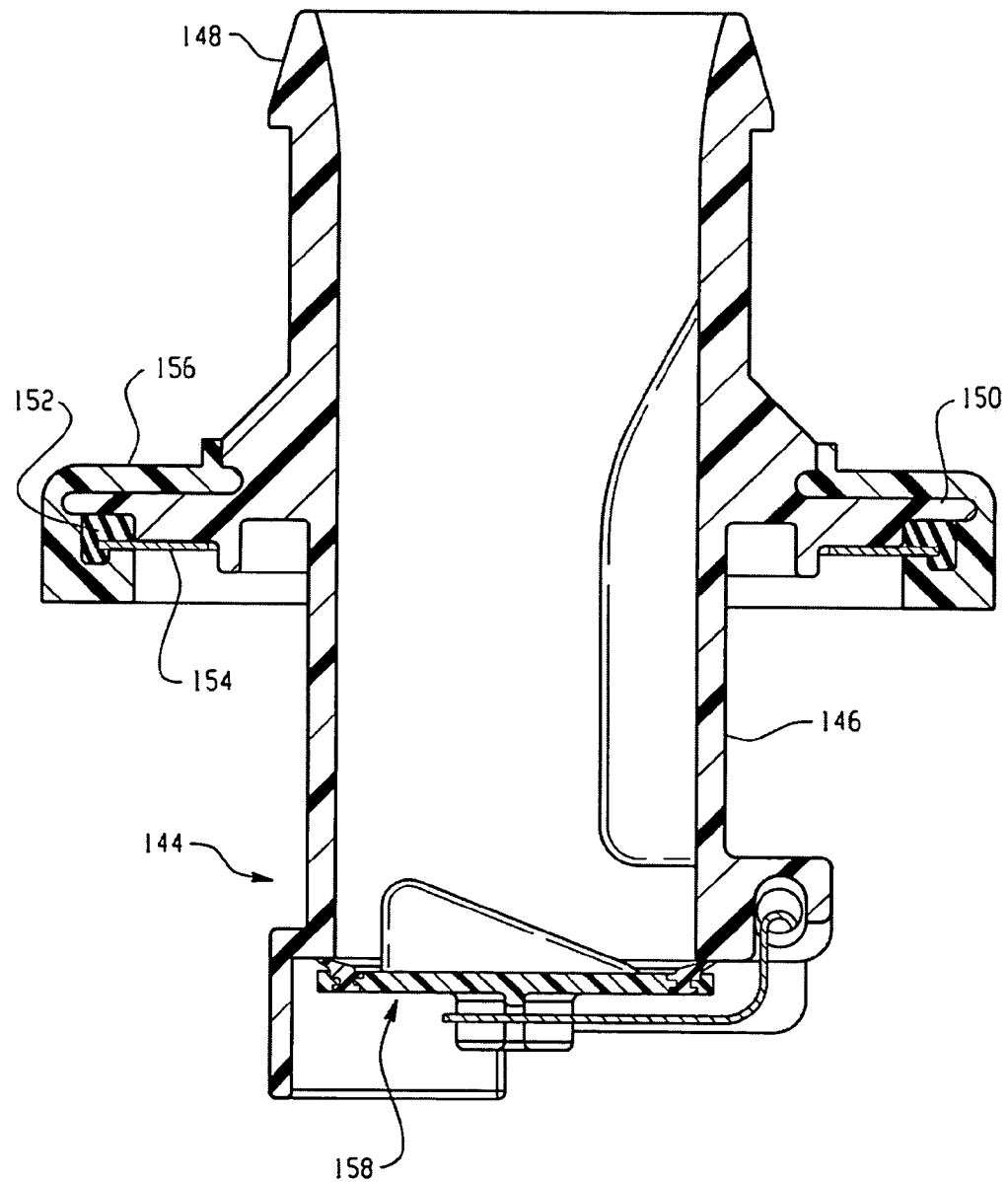
FIG. 4 is an alternate embodiment of the valve for employment in the system of FIG. 2.

Referring to FIG. 4, an alternate embodiment of a one-way valve assembly for attachment to a plastic fuel tank is illustrated generally at 144 and includes a tubular valve body 146 preferably formed as an integral one-piece member with the upper end thereof provided with an annular barb 148 which is intended to be received in the lower end of the hose 110 of the FIG. 2 system arrangement.

The tubular valve body 146 has an annular radially outwardly extending flange 150 provided thereon and preferably formed integrally therewith. A seal ring, preferably formed of elastomeric material, denoted by reference numeral 152 is disposed about the outer periphery of the flange 150 on the underside thereof and may be retained in position thereon by a retaining ring 154 which may frictionally engage an annular shoulder 151 provided on the flange 150. Seal 152 and flange 150 are provided with an overlay 156 preferably formed by overmolding with material compatible with the plastic fuel tank 102 to facilitate attachment thereto as, for example, by weldment in a manner similar to the embodiment of FIG. 5.

A one-way valve indicated generally at 158 is provided on the lower end of the tubular member 146; and, it will be understood that the valve member 158 may be identical to the valve members 50, 134 of the embodiments of FIGS. 3 and 5. The hose 110 is assembled over the barb 148 and tube 112 received in the upper end of hose 110. The assembly of valve 144 and hose 110 and nozzle receptacle 112 is then installed in the access opening in the tank and secured by weldment of overmold 156 to the tank. Thus, the valve 144 of FIG. 4 is installed and functions in the same manner as the valve of FIG. 5.

The present invention thus provides a simple and easy to manufacture filler tube assembly including a common one-way valve for installation on either a metal or plastic fuel tank. The one-way valve is configured internally with ribs to deflect a siphon hose inserted through the filler tube so that the siphon hose opens the one-way valve and passes through into the interior of the fuel tank. The valve includes ribs on the valve member which operate to prevent breakup of the flow stream during refueling which minimizes the vapor formation and vapor pressure in the tank during refueling.

Although the invention has hereinabove been described with respect to the illustrated embodiments, it will be understood that the invention is capable of modification and variation and is limited only by the following claims.

What is claimed is:

1. A one-way valve assembly for connecting with a fuel tank filler neck comprising:
   a tubular shell with a valve seating surface disposed about one end thereof with a reduced diameter exterior portion on an end opposite said one end adapted for insertion in the end of an existing filler neck; and
   a moveable valve member disposed for movement between a position closing on said valve seat and a position away from said valve seat with a plurality of spaced ribs disposed thereon operable for minimizing dispersion of the flow stream during refueling through the fuel tank filler neck with respect to said one end of said tubular shell and operable to prevent a siphon hose from catching on the valve member, wherein the valve member is biased into contact with said valve seating surface,
   wherein said tubular shell and said valve member are formed of plastic material and wherein said plastic material is interspersed with electrically conductive material for facilitating discharge of accumulated static electrical charge.

2. A one-way valve assembly for connecting with a fuel tank filler neck comprising:
   a tubular shell with a valve seating surface disposed about one end thereof with a reduced diameter exterior portion on an end opposite said one end adapted for insertion in the end of an existing filler neck; and
   a moveable valve member disposed for movement between a position closing on said valve seat and a position away from said valve seat with a plurality of spaced ribs disposed thereon operable for minimizing dispersion of the flow stream during refueling through the fuel tank filler neck with respect to said one end of said tubular shell and operable to prevent a siphon hose from catching on the valve member, wherein the valve member is biased into contact with said valve seating surface,
   wherein said valve member includes a pair of arms extending therefrom with end portions thereof pivotally engaging said tubular shell and wherein said pair of arms are deflected when attached to the tubular shell.

3. The assembly defined in claim 2, further comprising:
   a projection extending from the tubular shell; and
   a pair of trunnions, each trunnion extending from one of said pair of arms, wherein the trunnions engage with the projection to attach the valve member to the tubular shell.

4. The assembly defined in claim 3, wherein the pair of arms are deflected to engage the trunnions with the projections.

5. The assembly defined in claim 2, further comprising a flexible annular seal disposed to seal between the valve member and the valve seating surface.

6. The assembly defined in claim 5, wherein the annular seal is formed of elastomeric material.

7. The assembly defined in claim 6 wherein said annular seal is attached to said valve member for movement therewith.

8. The assembly defined in claim 2, wherein said tubular member includes an inwardly extending rib for guiding a siphon hose upon insertion therein.

9. A one-way valve assembly for connecting with a fuel tank filler neck comprising:
   a tubular shell with a valve seating surface disposed about one end thereof with a reduced diameter exterior portion on an end opposite said one end adapted for insertion in the end of an existing filler neck; and
   a moveable valve member disposed for movement between a position closing on said valve seat and a position away from said valve seat with a plurality of spaced ribs disposed thereon operable for minimizing dispersion of the flow stream during refueling through the fuel tank filler neck with respect to said one end of said tubular shell and operable to prevent a siphon hose from catching on the valve member, wherein the valve member is biased into contact with said valve seating surface, wherein said tubular shell has a slot formed thereon with portions of said valve member received therein and permitting axial movement for facilitating seating of said valve member on said opposite end of said tubular shell.

10. The assembly defined in claim 9 wherein said valve member attached to said tubular shell for pivotal movement.

11. The assembly defined in claim 9, further comprising a resilient member that biases the valve member into contact with said valve seating surface.

12. The assembly defined in claim 11, wherein said resilient member comprises a torsion spring with at least one coil formed thereon.

13. The assembly defined in claim 11, wherein said valve member is mounted on said resilient member for limited lost motion for self alignment with said valve seating surface.

14. The assembly defined in claim 11, wherein said resilient member comprises a torsion spring with a coil portion thereof received in a slot formed on the tubular member.

15. The assembly defined in claim 14 wherein said slot is sized to permit limited transverse movement of said coil with respect thereto.

16. The assembly defined in claim 11, wherein said resilient member has one end thereof contacting said valve member in the center thereof.

17. The assembly defined in claim 16, wherein said valve member has a V-shaped groove with said one end of said resilient member nested therein for centering said resilient member into contact with said valve member.

\* \* \* \* \*